US012602600B1

(12) United States Patent
Mason et al.

(10) Patent No.: US 12,602,600 B1
(45) Date of Patent: Apr. 14, 2026

(54) PREDICTIVE MACHINE LEARNING MODELS FOR PARCELS OF REAL PROPERTY

(71) Applicant: DOMA TECHNOLOGY LLC, San Francisco, CA (US)

(72) Inventors: Erica Mason, San Francisco, CA (US); Yalixa De La Cruz, Pembroke Pines, FL (US); Andy Mahdavi, San Francisco, CA (US)

(73) Assignee: Doma Technology LLC, San Francisco, CA (US)

( * ) Notice: Subject to any disclaimer, the term of this patent is extended or adjusted under 35 U.S.C. 154(b) by 611 days.

(21) Appl. No.: 17/001,581

(22) Filed: Aug. 24, 2020

Related U.S. Application Data

(63) Continuation-in-part of application No. 16/716,289, filed on Dec. 16, 2019, now Pat. No. 10,755,184, which is a continuation of application No. 16/505,259, filed on Jul. 8, 2019, now Pat. No. 10,510,009.

(51) Int. Cl.
*G06N 5/04* (2023.01)
*G06N 20/00* (2019.01)
*G06Q 40/03* (2023.01)

(52) U.S. Cl.
CPC .............. *G06N 5/04* (2013.01); *G06N 20/00* (2019.01); *G06Q 40/03* (2023.01)

(58) Field of Classification Search
CPC .......... G06N 5/04; G06N 20/00; G06Q 40/03
See application file for complete search history.

(56) References Cited

U.S. PATENT DOCUMENTS

| | | | | |
|---|---|---|---|---|
| 5,361,201 A | * | 11/1994 | Jost | G06Q 40/02 705/35 |
| 7,472,096 B2 | | 12/2008 | Burges et al. | |

(Continued)

FOREIGN PATENT DOCUMENTS

| | | | | |
|---|---|---|---|---|
| WO | WO 2014/014759 | | 1/2014 | |
| WO | WO-2014014759 A1 | * | 1/2014 | G06Q 40/02 |

OTHER PUBLICATIONS

U.S. Appl. No. 16/525,317, filed Jul. 29, 2019, Brian Holligan.

(Continued)

*Primary Examiner* — Brent Johnston Hoover
(74) *Attorney, Agent, or Firm* — Gustafson IP

(57) ABSTRACT

Methods, systems, and apparatus, including computer programs encoded on computer storage media, for training and applying a machine learning model. One of the methods includes the actions of obtaining a collection of data associated with a specified parcel of real property, wherein the collection of data includes one or more parameters of interest; using a machine learning model to generate a prediction from the input collection of data for each of the one or more parameters of interest, wherein the prediction for each parameter of interest comprises a likelihood value that the parameter satisfies a particular condition, and wherein the machine learning model is trained using a training set comprising a collection of data associated with a labeled set of data, the labels indicating the existence of particular parameters on the parcels; and based on the prediction, classifying each of the one or more parameters of interest.

15 Claims, 5 Drawing Sheets

500

(56) References Cited

U.S. PATENT DOCUMENTS

| | | | |
|---|---|---|---|
| 8,639,618 | B2 | 1/2014 | Yan et al. |
| 10,255,550 | B1 | 4/2019 | Simkoff et al. |
| 10,510,009 | B1 | 12/2019 | Mahdavi |
| 10,650,460 | B2 | 5/2020 | Bostic |
| 10,755,184 | B1 | 8/2020 | Holligan et al. |
| 10,943,294 | B1 | 3/2021 | Tarmann et al. |
| 11,010,831 | B1 | 5/2021 | Tarmann et al. |
| 11,151,647 | B1 | 10/2021 | Tarmann |
| 11,216,831 | B1 | 1/2022 | Holligan et al. |
| 11,715,120 | B1 | 8/2023 | Holligan et al. |
| 12,340,383 | B1 | 6/2025 | Holligan et al. |
| 2004/0059653 | A1 | 3/2004 | Verkuylen et al. |
| 2004/0220872 | A1 | 11/2004 | Pollock |
| 2005/0210068 | A1 | 9/2005 | Szymanski et al. |
| 2010/0063948 | A1 | 3/2010 | Virkar |
| 2011/0238566 | A1* | 9/2011 | Santos .................... G06Q 40/03 705/38 |
| 2013/0204823 | A1 | 8/2013 | Treiser |
| 2013/0346351 | A1 | 12/2013 | Lin et al. |
| 2014/0025548 | A1 | 1/2014 | Serio |
| 2017/0323216 | A1 | 11/2017 | Fano |
| 2018/0253808 | A1 | 9/2018 | Bloomquist et al. |
| 2019/0333172 | A1 | 10/2019 | Hiltch et al. |
| 2020/0273115 | A1 | 8/2020 | Bostic |
| 2023/0394569 | A1 | 12/2023 | Tarmann |

OTHER PUBLICATIONS

Bandyopadhyay, "Strategic Default and Moral Hazard in Real Estate: Insights from Machine Learning Applications," Dissertations, Theses, and Capstone Projects, City University of New York, Jun. 2021, 187 pages.
Decision on Request dated Apr. 5, 2021 in related U.S. Appl. No. 90/014,691 (12 pages).
Decision on Request dated Mar. 19, 2021 in related U.S. Appl. No. 90/014,666, 40 pages.
Decision on Request dated May 18, 2021 in related U.S. Appl. No. 90/014,729 (15 pages).
Henry, Ronnie, "Etymologia: Markov Chain Monte Carlo," Emerg Infect Dis., 2019, 3 pages.
Linear Regression, http://www/stat.yale.edu/Courses/1997-98/101/linreg.htm.
Notice of Intent to Issue Ex Parte Reexamination Certificate in U.S. Appl. No. 90/014,729, dated May 23, 2022, 5 pages.
Office Action dated Sep. 17, 2021 in related U.S. Appl. No. 90/014,691 (67 pages).
Office Action dated Sep. 30, 2021 in related U.S. Appl. No. 90/014,666, 15 pages.
Order Granting Request For Ex Parte Reexamination in U.S. Appl. No. 90/014,729, dated May 18, 2021, 18 pages.
Reexam Request dated Apr. 14, 2021 in related U.S. Appl. No. 90/014,729 (114 pages).
Reexam Request dated Jan. 29, 2021 in related U.S. Appl. No. 90/014,666, 115 pages.
Reexam Request dated Mar. 5, 2021 in related U.S. Appl. No. 90/014,691 (70 pages).
Reexamination Certificate in U.S. Appl. No. 90/014,729, certificate issued on Jul. 1, 2022, 4 pages.
US Office Action in U.S. Appl. No. 90/014,729, dated Aug. 19, 2021, 17 pages.
US Office Action in U.S. Appl. No. 90/014,729, dated Mar. 4, 2022, 40 pages.
US Office Action in U.S. Appl. No. 90/014,729, dated Nov. 19, 2021, 41 pages.
US Office Action in U.S. Appl. No. 90/014,666, dated Oct. 5, 2022, 19 pages.
Andrieu et al., "An introduction to MCMC for machine learning," Machine Learning, Jan. 2003, 50(1):5-43.
Arutjothi et al., "Prediction of loan status in commercial bank using machine learning classifier," 2017 International Conference on Intelligent Sustainable Systems (ICISS), Dec. 7, 2017, 416-9.
Choi et al., "Markov chain monte carlo estimation methods for structural equation modeling: a comparison of subject-level data and moment-level data approaches," Biometrics and Biostatistics International Journal, Dec. 20, 2017, 6(5):463-74.
Haddon, "Modelling and Quantitative Methods in Fisheries," (2nd ed.), Feb. 1, 2010, 21 pages.
Robinson, "Nondifferentiable Optimization," Jun. 7, 2015, obtained May 5, 2021 from URL <https://optimization.mccormick.northwestern.edu/index.php/Nondifferentiable_Optimization>, 5 pages.
Simes et al., "Model Title Standards," Ann Arbor: University of Michigan Law School, 1960, 56 pages.
Towers, "Markov Chain Monte Carlo parameter optimization method," Jul. 15, 2014, obtained May 5, 2021 from URL <http://sherrytowers.com/2014/07/15/markov-chain-monte-carlo-parameter-optimization-method/>, 5 pages.
Egloff, "Monte Carlo Algorithms for Optimal Stopping and Statistical Learning," 2005, The Annals of Applied Probability, 15(2):1396-1432.
CTBar.org [online], "The Title Search: What You Need to Know," Mar. 23, 2016, retrieved on Sep. 11, 2023, retrieved from URL<https://www.ctbar.org/docs/default-source/resource-manager/erp160323_final_materials>, 178 pages.
Evans, "A Review of Complicated Priority Disputes and Lien Issues Under California Law," Advanced Issues in Foreclosure, National Business Institute, 2011, 17 pages.
JetClosing.com [online], "Title Review Made Simple," available on or before Dec. 3, 2020, via Internet Archive: Wayback Machine URL<https://web.archive.org/web/20201203074940/https://www.jetclosing.com/title-review-made-simple/>, retrieved on Sep. 11, 2023, URL<https://www.jetclosing.com/title-review-made-simple/>, 3 pages.
Order Granting Request for Ex Parte Reexamination in U.S. Appl. No. 90/019,210, dated Aug. 8, 2023, 30 pages.
ParkerPoe.com [online], "Get to Know Your Real Estate—Focus on Due Diligence Fundamentals in Tough Times," Nov. 30, 2011, retrieved on Sep. 11, 2023, retrieved from URL<https://www.parkerpoe.com/news/2011/11/get-to-know-your-real-estate-focus-on>, 4 pages.
Shunnar, "Detecting Fraudulent Activities in Land Record Systems: An Application of Data Mining," Thesis in partial fulfilment of the requirements for the degree of Master of Science, University of Calgary, Department of Geomatics Engineering, Sep. 2011, 180 pages.
Araj, "What Is A Second Mortgage and How Does It Work?" Apr. 10, 2023, retrieved on May 14, 2024, retrieved from URL<https://www.rocketmortgage.com/learn/second-mortgage)>, 13 pages.
In re Heavey, 549 B.R 1 (Bankr. E.D.N.Y. 2016), 11 pages.
Javangwe, "A systems approach to the management of demand risk in commercial property development," 2007, University of Johannesburg, 108 pages.
Testimony of Frank Pellegrini on Behalf of the American Land Title Association before The House Financial Services Subcommittee on Oversight and Investigations, One Hundred Eleventh Congress, First Session, Jun. 18, 2009, Serial No. 111-46, 22 pages.

* cited by examiner

*200*

*202* Receive Parcel Data

*204* Identify mortgage information

*206* Input mortgage information to machine learning model

*208* Determine whether probability for each mortgage satisfies threshold

*208* Mortgage decision

*300*

*302* Receive training data

*304* Generate machine learning model

*306* Train machine learning model using training data

*308* Optimize parameter values using Markov Chain

*310* Test model accuracy

502 Receive data

504 Identify involuntary liens

506 Input lien information to machine learning model

508 Determine whether probability for each lien satisfies one or more threshold

510 Lien decision

PREDICTIVE MACHINE LEARNING MODELS FOR PARCELS OF REAL PROPERTY

CROSS-REFERENCE TO RELATED APPLICATIONS

This application is a continuation-in-part application of, and claims priority, to U.S. patent application Ser. No. 16/716,289, filed on Dec. 16, 2019, which is a continuation application of U.S. patent application Ser. No. 16/505,259, filed on Jul. 8, 2019, and now U.S. Pat. No. 10,510,009. The disclosure of the foregoing applications are incorporated here by reference.

BACKGROUND

This specification relates to machine learning. Conventional machine learning models can be used to classify particular input data. Typically, a machine learning model is trained using a collection of labeled training data. The machine learning model can be trained such that the model correctly labels the input training data. New data can then be input into the machine learning model to determine a corresponding label for the new data.

SUMMARY

In general, one innovative aspect of the subject matter described in this specification can be embodied in methods that include the actions of obtaining a collection of training data, the training data comprising collection of data points associated with a labeled set of real property parcels; training a machine learning model using the training data, the machine learning model being trained to generate a likelihood with respect to a parameter from input data associated with a specific parcel of real property, wherein training includes optimizing the model using a Markov chain optimization that seeks to minimize error in the model where the model is underpinned by one or more non-differentiable functions; receiving a plurality of data points associated with an input parcel of real property; and using the optimized model to generate a likelihood for the parameter for the input parcel of real property.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Optimizing the machine learning model includes: selecting a first set of model parameter values; evaluating the model performance using the initial set of model parameter values; selecting a second set of model parameter values; evaluating the model performance using the next set of model parameter values;

determine whether the model performance has improved; in response to determining that the model performance improved, selecting a third set of model parameter values relative to the values of the second set of parameter values; and in response to determining that the model performance has not improved, selecting the third set of model parameter values relative to the values of the first set of model parameter values, with some likelihood of retaining a worsened position to avoid missing a globally optimum point. Additional sets of parameter values are selected based on the evaluation of the model performance of the previous set until a stopping criteria is reached. Evaluating the model performance includes determining a degree of error between the model output and a known parameter value. The predicted parameter is a likelihood that a mortgage attached to the specified parcel of real property is open. The predicted parameter is a likelihood of a title defect affecting a parcel of real property.

In general, one innovative aspect of the subject matter described in this specification can be embodied in methods that include the actions of obtaining, from one or more sources, a collection of data associated with a specified parcel of real property including data associated with particular owners of parcels of real property, wherein the collection of data includes one or more parameters of interest; inputting the collection of data to a machine learning model; using the machine learning model to generate a prediction from the input collection of data for each of the one or more parameters of interest, wherein the prediction for each parameter of interest comprises a likelihood value that the parameter satisfies a particular condition, and wherein the machine learning model is trained using a training set comprising a collection of data associated with a labeled set of real property parcels distinct from the specified parcel of real property, the labels indicating the existence of particular parameters in the parcels; and based on the prediction, classifying each of the one or more parameters of interest based on a comparison of the respective likelihood values with one or more threshold values.

The subject matter described in this specification can be implemented in particular embodiments so as to realize one or more of the following advantages. A machine learning model can be used to determine a likelihood that a mortgage for a parcel of real property is open using historical information for a collection of parcels of real property. This can greatly simplify the title insurance process of determining whether all prior mortgages on the parcel of real property have been paid without relying solely on human judgment or error prone data associated with the parcel. Mortgages having a high likelihood of being open can then be analyzed using conventional techniques.

A machine learning model can also be used to determine a likelihood that an involuntary lien attached to a parcel of real property exists or has been released using historical information for a collection of parcels of real property. Additionally, the machine learning model can be used to determine a likelihood that an involuntary lien is attached to the parcel of real property based on that property. This can further simplify the title insurance process of determining whether all liens attached to a parcel of real property have been released or are correctly identified on a title commitment document. Liens having a threshold likelihood of having been released can be considered resolved automatically while other liens for which the likelihood is insufficient to make a determination can be flagged for manual evaluation.

The machine learning models used to determine open mortgages, involuntary liens, or to otherwise evaluate title risk for real property can be optimized using a Markov chain optimization technique. This provides a more efficient means for optimizing parameters for a predictive model for a non-differentiable function such as title risk as compared to a brute force technique that tries all possible combinations of parameters to determine the optimal parameter values.

The above techniques can be part of an automated underwriting system that programmatically evaluates title risk for a parcel of real property as part of generating a title insurance policy in a real estate transaction. Evaluating one or more risk factors programmatically improves efficiency in providing title insurance, which can reduce closing time and costs in real estate transactions. In addition, these methods can reduce the variability around closing times for a real estate transactions. This enables lenders and borrowers to more efficiently schedule their closings, at lower inconvenience to all parties involved.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
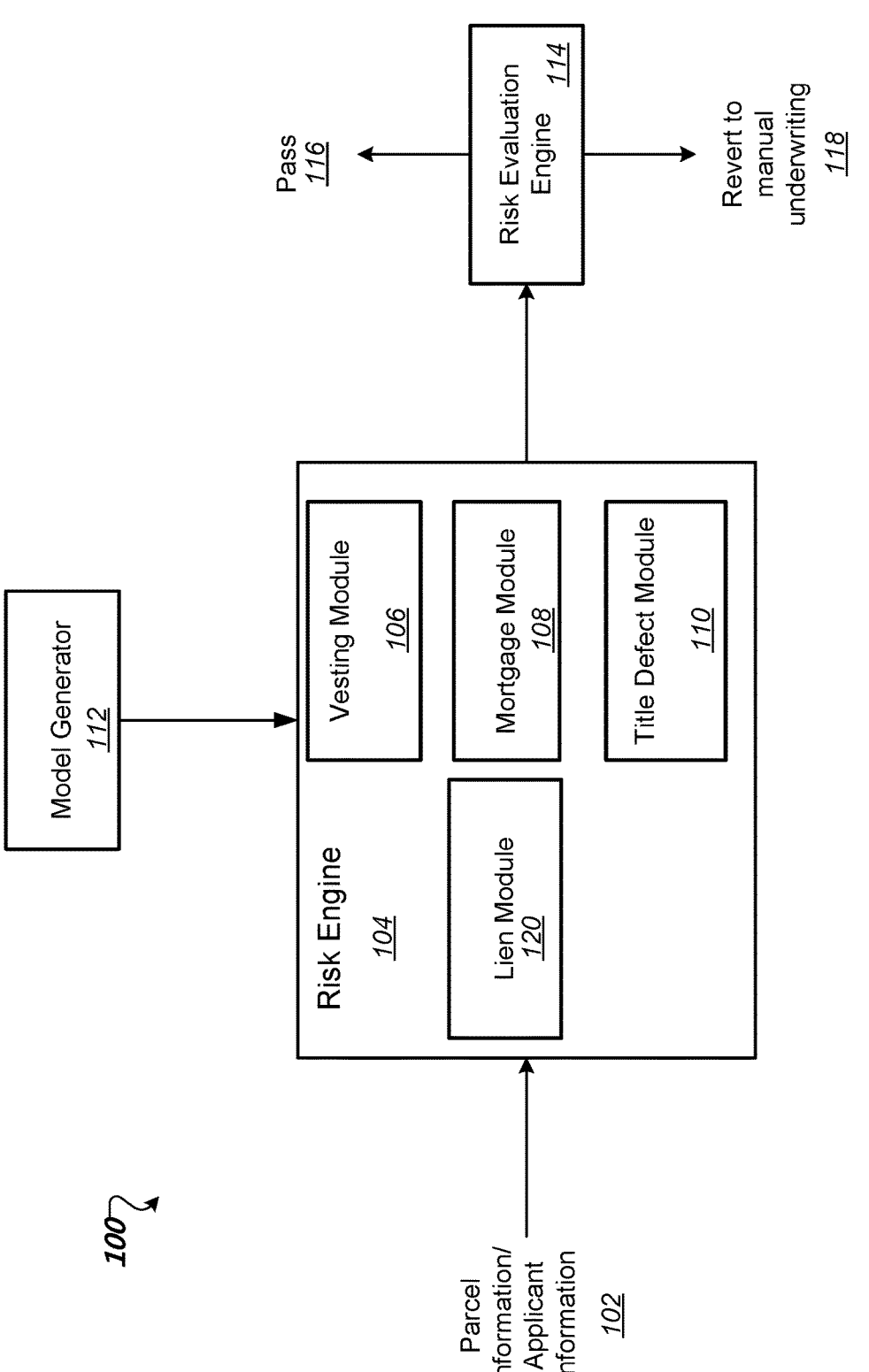
FIG. 1 is a block diagram of an example system for evaluating title risk.

This specification describes techniques for training, optimizing, and applying a machine learning model. The machine learning model can be trained to predict whether a parameter is likely to occur as well as a magnitude of the parameter. The machine learning model can be trained using a collection of data with known values for the prediction parameter. The output of the machine learning model can be compared with one or more thresholds to determine an action responsive to the prediction.

For example, in some implementations, the machine learning model can be used to evaluate a parameter associated with a parcel of real property based on a model trained from data obtained for a collection of other parcels of real property. The parameter being predicted can include a prediction of whether or not a mortgage attached to the property has been paid for each historical mortgage on the parcel of real property. In some other embodiments, the parameter being predicted can include a prediction of whether or not each involuntary lien attached to the property has been released.

In a real estate transaction involving a parcel of real property, an important step is accounting for all mortgages and other liens that have attached to the property. In particular, in a purchase transaction for a parcel of real estate, a buyer may obtain a mortgage as part of the purchase. That mortgage lender needs to be the prime lienholder on the property without any intervening mortgages having precedence. Thus, it is important to ascertain whether any mortgages are still open on the property. Any identified defects, for example, an existing mortgage on the parcel, typically need to be resolved before a title company will issue title insurance for the parcel. In the event that an unidentified defect is later discovered, the title insurance insures against any losses resulting from the defect. Consequently, title insurance is often required in real estate transactions and particularly for those financed by third parties.

Existing data sources for mortgage and lien information can be error prone. For example, an older mortgage or lien may not be identified as closed or released even though it is no longer attached to the property. As a result, human reviewers are often required to examine, e.g., the set of open mortgages to determine whether or not they are actual open or have been previously paid off. A machine learning model can be used to determine the likelihood that an identified mortgage is still open regardless of the status indicated in the data records for the parcel. Similarly, another machine learning model can be used to determine the likelihood that an identified involuntary lien is released or not, again, regardless of the status indicated on the data records for the parcel. Those mortgagees and liens that have likelihoods relative to one or more specified thresholds can be then evaluated by human reviewers.

Finally, the error prone nature of existing mortgage data can cause traditional title insurance providers to entirely miss a mortgage that is outstanding, because the mortgage data may simply not exist in the public record due to a human error. A machine learning model can be used to flag such a mortgage when another mortgage has been subordinated to it during a prior transaction. This model can reduce the risk of negative consumer or lender impact when such a mortgage is missed during the traditional process.

Streamlining the evaluation of open mortgages can facilitate decisions on issuing title insurance. In particular, the more facets of title insurance that can be determined programmatically, the faster title insurance decisions can be made.

Title Evaluation System

FIG. 1 is a block diagram of an example system 100 for evaluating title risk, for example, as part of generating a title insurance policy. In some implementations, the system 100 can be used to generate a rapid decision as to whether to issue a title insurance policy or whether further analysis is required.

The system 100 includes a title risk engine 104. The title risk engine 104 processes parcel and/or party data 102 input to the system. For example, this can describe a number of different details about the parcel including mortgage information indicating when mortgages were recorded against the parcels as well as when any were removed. The information can also include transactions associated with the parcels including a retail history for the property, e.g., prior dates of sale. This can also include information about the parties involved in the transaction such as the purchaser and seller information for each historical transaction involving the parcel or any judgements and lien history associated with the parties.

The title risk engine 104 processes the input data 102 to generate one or more risk scores that are passed to a risk evaluation engine 114. The processing of the input data can include processing by various modules designed to evaluate different kinds of title risk. These modules can include a vesting module 106, a mortgage module 108, a title defect module 110, and a lien module 120. The vesting module 106 determines the current owner(s) of the parcel based on the input data. The mortgage module 108 uses a particular machine learning model to determine a likelihood of open mortgages associated with the real estate parcel. The title defect module 110 uses a particular machine learning model to determine a likelihood of a title defect associated with the parcel of real property based on the input data about the parcel of property, e.g., a likelihood of an existing lien against the property. The lien module 120 uses a particular machine learning model to determine a likelihood that a given involuntary lien associated with a parcel of real property is released or not.

The mortgage module 108 and the title defect module 110 can use respective machine learning models trained by one or more model generator 112. Similarly, the lien module 120 can use another trained machine learning model trained by the model generator 112.

The model generator 112 uses training data to train a model designed to generate a particular prediction based on input data, as described in greater detail below with respect to FIG. 3. An example machine learning model for determining a likelihood of a title defect can be found in U.S. Pat. No. 10,255,550, which is incorporated here by reference in its entirety. The risk evaluation engine 114 can receive one or more scores from the title risk engine 104. Each score can indicate a likelihood of a particular parameter evaluated by the one or more modules. For example, a respective score can be provided for each identified open mortgage indicating a likelihood determined by the mortgage module 110 that the mortgage is still open. In another example, the score from the vesting module can indicate a level of confidence in identifying the name or names of the current owners of the parcel.

In response to receiving the scores, the risk evaluation engine 114 can determine whether to pass 116 the title analysis indicating that a title insurance policy can be issued without further human review or whether to revert to manual underwriting 118 for at least a portion of the title analysis. The determination can be based on one or more threshold values that indicate a risk tolerance for the particular parameter. In some implementations, a combined score can be compared to an overall threshold indicating risk tolerance for all of the predicted parameters. The combination can include weighting the score from a particular module based on the impact to acceptable risk associated with each parameter.

For example, the score determined for each open mortgage can be compared to the threshold value for open mortgages. If the score exceeds the threshold, e.g., the likelihood that the mortgage is open exceeds the threshold value, then the mortgage is passed to manual evaluation. If not, then the mortgage is within the risk tolerance and can be passed without further evaluation. Similarly, the scores (likelihoods) determined for each involuntary lien can be compared to one or more thresholds. Based on the comparison, described in more detail below with respect to FIG. 5, the involuntary lien can be identified as released, active, or flagged for manual evaluation.

Determining Likelihood of Open Mortgages

Figure 2:
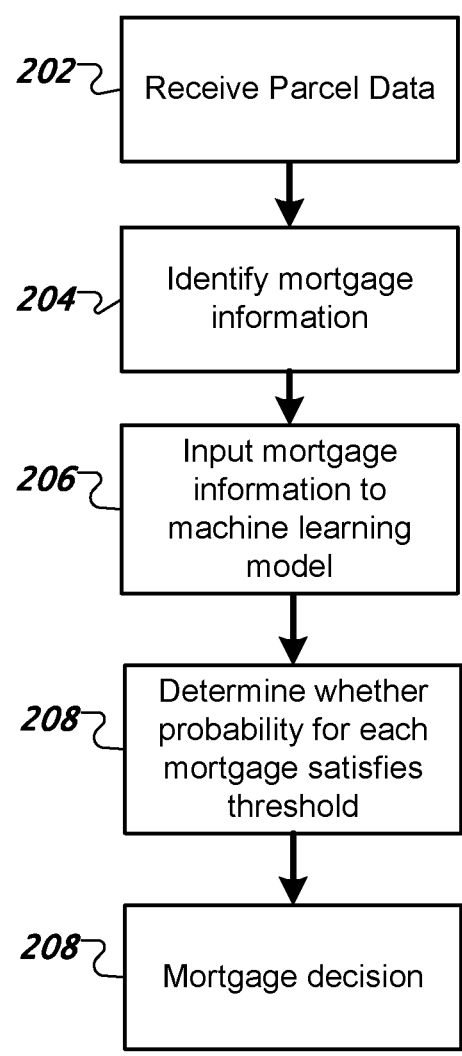
FIG. 2 is a flow diagram of an example method for using machine learning to evaluate open mortgages to real property.

FIG. 2 is a flow diagram of an example method 200 for using machine learning to evaluate open mortgages to real property. For convenience, the method 200 will be described as being performed by a system of one or more computers, located in one or more locations, and programmed appropriately in accordance with this specification. For example, system 100 of FIG. 1, appropriately programmed, can perform the method 200.

The system receives parcel data (step 202). The parcel data can be obtained from a third party service or collected from one or more data sources, e.g., county records offices. These records can include dates at which mortgages were recorded against the parcel of real property, dates of sales of the parcel, and dates when mortgages were removed from the parcel.

The system identifies the specific mortgage information from the parcel data (step 204). This includes identifying each mortgage recorded against the parcel and whether or not the parcel data indicates that the mortgage is open. In some implementations, if a mortgage is no longer open, e.g., a later record in the parcel data indicates that the mortgage has been closed, it can be discarded such that only a list of purportedly open mortgages remain.

The mortgage information can be extracted from the parcel data by looking for deeds of trusts, assignments, subordinations, releases, and similar data from the chain of title and compiling such data into the mortgage information data set. Each item in the mortgage information data set contains the instrument number, dollar amount, principal amount, grantee, grantor, and other relevant mortgage data.

The system inputs the mortgage information for the list to a machine learning model to generate a likelihood that each individual mortgage is actually open (step 206). The input to the machine learning model includes the dates associated with the identified mortgages in the parcel data as well as other statistical information retrieved from the parcel data, for example, the transaction dates associated with each sale or refinance of the parcel.

The machine learning model, described in greater detail below, is trained on a collection of parcel data for which information on mortgages is known. Based on a collection of training data from other parcels of real property the model is trained to evaluate the statistics for the parcel of interest to determine a prediction of how likely the mortgage is to be actually still open on the parcel. For example, if a change of ownership has occurred since the 'open' mortgage was recorded it may be less likely that the mortgage is actually open given that the training data indicates that existing mortgages are typically closed when the property changes hands. Another example can include at determination of the proximity of a mortgage to a foreclosure event, which typically renders such mortgages no longer open.

Another factor is whether the parcel data indicates an occurrence of a potentially open mortgage that does not directly appear in the parcel data. For example, an record of a subordinate mortgage in the parcel data can indicate a missing mortgage that may be open. For example, when an owner takes out a second mortgage on a property, that second mortgage is subordinated to the first mortgage because the first mortgage takes precedence over the second, e.g., during a sale or foreclosure. Such a mortgage may not have been even detected for evaluation in a traditional human search.

For each mortgage in the list of potentially open mortgages, the machine learning model generates a respective probability that the mortgage is actually open. These probability scores are then evaluated with respect to a threshold value (step 208). The threshold can be established based on a level of acceptable risk based on the prediction. In some implementations, the threshold is set based upon an analysis of multiple factors. For example, a collection of historical data can be used to determine an historical occurrence for the parameter. In the case of title defects resulting from unaccounted for open mortgages, this can include past occurrences of similar defects and the value of the resulting title insurance claims. Few instances of significant defects can lead, for example, to a higher threshold level of risk being acceptable.

In some implementations, determining the threshold can include analyzing historical information on past claims relative to other operating expenses and revenue to determine the threshold level such that the model will only pass predicted occurrences of a title defect having magnitudes of cost within an acceptable amount of overall cost relative to revenue.

This threshold can be changed in view of actual performance of the model. For example, if a particular threshold leads to real world results of a higher number of errors than expected, then the threshold can be modified to require a lower likelihood that the mortgage is open to trigger manual evaluation.

Based on the comparison of the mortgages to the threshold value, a decision is made as to whether one or more of the mortgages require further analysis, e.g., manual evaluation by one or more human evaluators. In some implementations, if the likelihood that the mortgage is open is less than the threshold value, then the mortgage is considered closed for the purposes of generating the title insurance policy.

The resulting output from the comparison can be provided to one or more users. For example, the decision can be added to a file associated with the parcel of real property and a user associated with the file can be alerted to the decision. In some implementations, the decision is determined while an associated user is working with the system and the decision can be displayed in a user interface of the system.

Training a Machine Learning Model

Figure 3:
FIG. 3 is a flow diagram of an example method for training a machine learning model.
Figure 3:
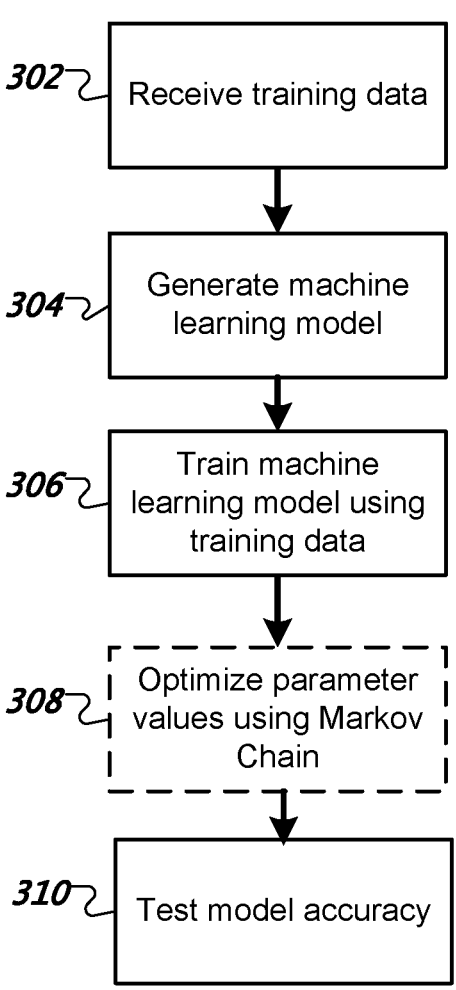

FIG. 3 is a flow diagram of an example method 300 for training a machine learning model. For convenience, the method 300 will be described as being performed by a system of one or more computers, located in one or more locations, and programmed appropriately in accordance with this specification. For example, model generator 112 of system 100 of FIG. 1, appropriately programmed, can perform at least part of the method 300.

The system receives training data from one or more data sources (step 302). The data sources can include a number of different databases including databases associated with public records locations as well as third party databases. In some implementations, a data aggregator can collect data associated with parcels of real estate. For example, in some implementations, the system is able to receive data from different local records offices for real property e.g., county records offices or property tax offices. The system can also receive data from third parties such as credit bureaus or title companies. In some implementations, the received training data includes unstructured content that that is processed to extract particular data. For example, optical character recognition can be used to identify content of a document which can be filtered based on identifying particular terms identified in the document.

The training data can be stored in a training data repository. The training data for a machine learning model often includes values for the parameter being predicted by the model. For example, in some implementations, the training data includes data values associated with a number of distinct parcels of real property. The data values for each parcel of real property can cover a variety of data including statistical data about the property itself including mortgage information indicating when mortgages are recorded against the parcels as well as when they are removed. The information can also include information about liens or other transactions affecting the parcel or the parcel's owner(s) and any releases from those liens. The information can also include transactions associated with the parcels including a retail history for the property, e.g., prior dates of sale, as well as purchaser and seller information.

The system generates a machine learning model (step 304). The machine learning model can be based off of one or more existing machine learning models as a foundation and configured to use specific features to train the model to generate a prediction for a specified parameter. In particular, the prediction can be a calculated likelihood for the parameter such as a likelihood that an input mortgage for a parcel is still open or a likelihood that an involuntary lien is released or not.

The system trains the machine learning model using the training data (step 306). In some implementations, the obtained training data is used as input to a training engine that trains a machine learning model based on the data and the known parameter values. As part of the training, the training engine extracts features from the training data and assigns various weights to the features such that a prediction and magnitude for the parameter correspond to the known parameter values. In some implementations, the features correspond to the different types of data in the training data or a subset of the types of data. The training of the model can be an iterative process that adjusts features and associated weights to some specified degree of accuracy relative to the known parameter values.

In some implementations, the machine learning model is trained to generate predictions that a given mortgage identified for a parcel of real property is still open. This prediction is based on the training that takes the collection of training data for a collection of distinct parcels of real property to learn which factors increase or decrease a likelihood of a mortgage being open in view of the known mortgage information of the training data. For example, the training data can show that when there is a sales transaction subsequent to an attached mortgage, and a new mortgage is recorded as part of the sale, that the likelihood of the pre-sale mortgage being open is low. However, if that pre-sale mortgage was not directly listed in the parcel data, but only identified indirectly, this could increase the risk that the mortgage was missed in the last sale and therefore could be open.

Similarly, in some other implementations, the machine learning model is trained to generate predictions that a given involuntary lien identified for a parcel of real property is active or released. This likelihood is based on the model training that takes the collection of training data for a collection of distinct parcels of real property to learn which factors increase or decrease a likelihood of an involuntary lien being active or released in view of the known lien information of the training data. For example, the training data can be used to train the model to learn how factors such as the age of the lien, intervening transactions, lien amounts, types of liens, or changes to the status of parties (e.g., marital status), increase or decrease a likelihood of an involuntary lien being released.

Optionally, particular optimization processes can be performed including a Markov chain optimization process (step

308). This optimization further adjusts particular parameter values in order to generate model predications that minimize the error between the predication and real world outcomes. A specific example of Markov chain based optimization process is described below with respect to FIG. 4.

The system tests the model accuracy (step 310). For example, the model can be tested against known parameter values for parcels that were not part of the training data to see if the model agrees with the known values. For a model trained to determine a likelihood of open mortgages, additional parcels with known mortgage histories can be input to the model to ensure that the model generates likelihoods that agree with the known histories. This evaluation can be performed, for example, to guard against a model that is overfit to the training data but leads to erroneous results on other data that is different than the training data. If deficiencies in the model are discovered, the model can be retrained, e.g., using additional training data that is more diverse.

The trained model can be stored as an output model or transmitted to another system, for example, to a title risk engine to be used as a particular module, e.g., mortgage module 108, or lien module 120 of FIG. 1.

Model Optimization

Machine learning models can be very complex. The mathematics underlying the model can have a number of parameters that can be adjusted. Different combinations of parameters can result in different model performance. Ideally, the values of the model parameters are specified to minimize the difference between the model prediction and the actual results. For example, to minimize the instances where a mortgage is predicted with high confidence to be open, when in reality it is not, or vice versa. Minimizing this error can provide a higher confidence in the model results. The higher confidence can be reflected in the selection of the threshold used to determine whether to trust the model results or to evaluate mortgages manually. The fewer mortgages that need manual review, the more title insurance decisions can be generated automatically.

Although it is possible to try every combination of parameter values to determine the set of parameters that minimize the error, this brute force technique can be very time consuming and computationally intense, in particular when there are multiple parameters leading to a very large number of possible combination of parameter values.

Another challenge in minimizing the error is based on the nature of the mathematical functions being evaluated by the model. In the case of non-differentiable functions, it is more difficult to determine if a global minimum has been reached or just a local minimum.

One technique for working with non-differentiable functions to find the minimum error, without trying every possible combination, is to use a Markov chain approach in which parameter values are tested relative to the immediately prior values in an iterative fashion that seeks to find the point at which the error cannot be reduced further.

Figure 4:
FIG. 4 is a flow diagram of an example optimization technique for a machine learning model.
Figure 4:
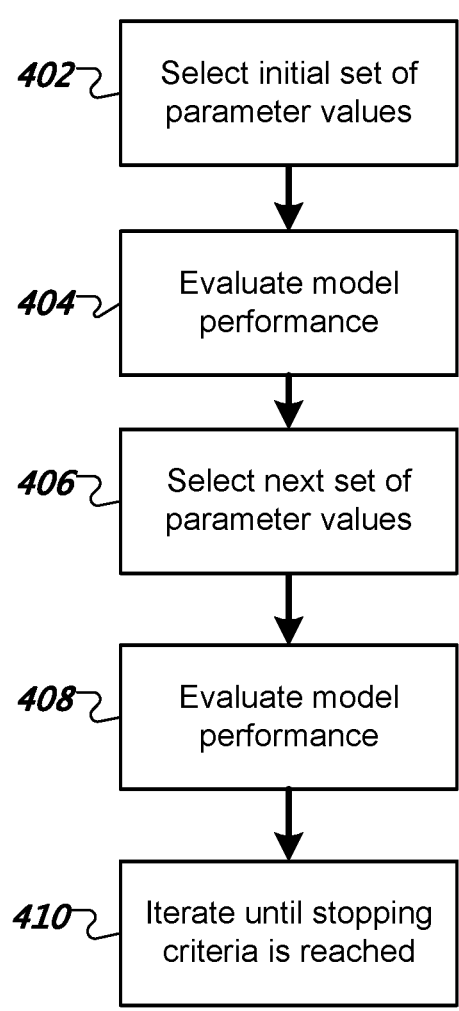

FIG. 4 is a flow diagram of an example optimization process 400 for a machine learning model. For convenience, the process 400 will be described as being performed by a system of one or more computers, located in one or more locations, and programmed appropriately in accordance with this specification. For example, model generator 112 of system 100 of FIG. 1, appropriately programmed, can perform at least part of the process 400.

The system selects an initial set of parameter values for the model (step 402). These model parameters define the underlying mathematics of the model. In some implementations, the initial set of parameter values are taken as those from the initial training the model. In some alternative implementations, the initial set of parameter values are selected at random.

The system evaluates the model based on the initial set of parameter values (step 404). For example, the model can be evaluated based on how closely the model outputs agree with the training data or other known parameter values.

The system selects a next set of parameter values as an set of random incremental changes from the prior set of parameter values, e.g., a small hop from the initial set of parameter values (step 406).

The system evaluates the model based on the next set of parameter values (step 408). In particular, the system determines whether the results of the model are better or worse than the prior evaluation of the parameter values. If there is an improvement in the model performance, a next iteration of parameter values is selected based off of the current parameter values. However, if the model performs worse, the system can either reset the parameter values to the prior set of parameter values, set or else the system can choose to keep the parameter values set to the worse-performing values. The more worse-performing a value is, the less likely that the system will choose to keep it. In either case, the system then selects a next iteration of randomly selected parameter values off of that set. Thus, if a hop ends up with improved performance, a next hop always occurs from that position. However, if a hop ends with worse performance, then there is a chance that the new hop can be based on the last position, in proportion to how much worse the current position is.

The system performs continued iterations of steps 406 and 408 until some stopping criteria is reached (step 410). The stopping criteria can be based on time, number of iterations, or performance results. In some implementations, when a specified number of iterations fail to improve performance of the model, then the process is stopped and those last best performing parameter values selected for the model.

Lien Evaluation

Figure 5:
FIG. 5 is a flow diagram of an example method of using machine learning to evaluate involuntary liens attached to real property.
Figure 5:
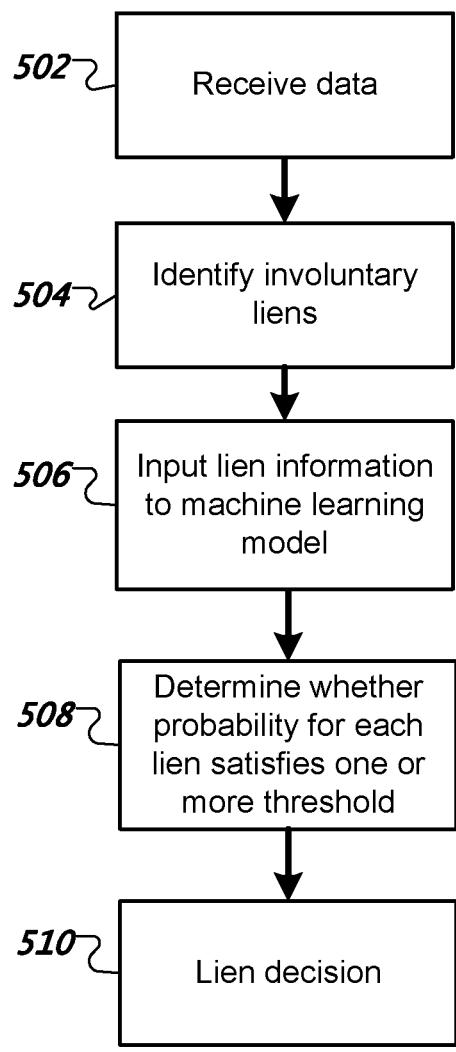

FIG. 5 is a flow diagram of an example method 500 of using machine learning to evaluate involuntary liens attached to a parcel of real property. For convenience, the method 500 will be described as being performed by a system of one or more computers, located in one or more locations, and programmed appropriately in accordance with this specification. For example, system 100 of FIG. 1, appropriately programmed, can perform the method 500.

The system receives data (step 502). The data can be obtained from a third party service or collected from one or more data sources, e.g., county records offices. In particular, the obtained data can include a description of transactions associated with a particular parcel of real property or a particular person(s). In some implementations, two sets of transaction data are obtained, a first set of transaction data associated with the particular parcel of real property and a second set of transaction data associated with an individual or individuals recorded in a particular jurisdiction, e.g., a county. Both sources of data help avoid missing any potential liens associated with the parcel. This is because county records offices typically index some transactions by property and other transactions by person.

The sets of transaction data can cover a defined time period, e.g., the last 30 years. The transaction data includes transactions such as mortgages, liens, and releases. Releases are indications that a lien has been removed, for example, by paying off an associated debt. The transaction data can include dates at which liens were recorded against the parcel of real property, dates of sales of the parcel, and dates when liens were released.

In some implementations, the sets of transaction data are further processed before moving on. For example, the list of transactions involving the name of a party (e.g., a property owner) may need further processing to determine that all of the listed transactions involve the same person. For example, a transaction may be recorded with a middle initial that is not found in other transactions (e.g., John Q. Smith vs. John Smith). In some other alternative implementations, the machine learning model can include features such as the distance from an original name to a listed name as a factor in determining the likelihood that the lien is valid and open.

The system identifies involuntary liens from the received data (step 504). Liens are typically classified as voluntary or involuntary. Voluntary liens are liens that are agreed to by the property owner. Examples of voluntary liens include mortgages and home equity loans. Involuntary liens are liens that can be attached without consent of the property owner. Examples of involuntary liens include mechanics liens, judgement liens resulting from a judicial proceeding, and HOA liens.

In some implementations, each transaction is labeled with a particular code. These codes are often specific to the county in which the transactions are recorded. Identifying the involuntary liens can therefore include cross referencing the transaction codes with county specific code descriptions. The code descriptions are then used to determine the kinds of transactions and thereby identify which transactions correspond to involuntary liens.

The system inputs the data for the identified involuntary liens into a machine learning model (step 506). The machine learning model is trained to generate, for each individual involuntary lien, a likelihood that the involuntary lien should be listed on a title commitment document associated with a pending transaction. The machine learning model can be trained based on a collection of data associated with other parcels of real property as described above with respect to FIG. 3.

The input to the machine learning model includes the identified involuntary liens, the dates associated with the identified involuntary liens, any recorded releases to the involuntary liens, as well as other information retrieved from the parcel data, for example, the transaction dates associated with each sale or refinance of the parcel. Another example of information is the name associated with the involuntary lien. The name is used to determine, for example, if the person associated with the lien is the same person that is associated with the parcel of real property.

The machine learning model, similar, for example, to the description above with respect to FIG. 3, is trained on a collection of data for multiple parcels of real property for which information on liens and releases is known. Based on the collection of training data from other parcels of real property the model is trained to evaluate input data for a particular parcel of interest to generate a prediction for each identified involuntary lien to determine a particular likelihood that the lien should be included in a title commitment document for the parcel.

The machine learning model is trained to understand, based on various features and the training data, whether a lien belongs on a title commitment or not. Features that can be used in training the model can include changes in ownership, age of the lien, and changes in marital status of joint owners of the parcel. Liens over a particular age may be less likely to still be pending. Changes in ownership may have released outstanding liens as part of an earlier transaction even if the release isn't specifically noted in the obtained parcel data. A divorce may indicate that it is more likely that there is an outstanding lien on the property. Further, the type of lien may provide an indication of the likelihood that it has been resolved.

Based on a large collection of data about other parcels, the machine learning model can predict the likelihood that a given involuntary lien identified for the parcel being evaluated has not been released. For each lien in the list of involuntary liens identified from the input data, the machine learning model generates a respective probability that the lien is active and should be included in the title commitment. These probability scores are then evaluated with respect to one or more threshold values (step 508). The threshold values can be established based on a level of acceptable risk to the prediction. Various actions can be taken based on whether or not the likelihood values satisfy a particular threshold. In some implementations, there is a single threshold. If the likelihood that the lien has not been released exceeds the threshold, then the lien is identified for inclusion in the title commitment. If the likelihood that the lien has been released does not exceed the threshold, the lien can be manually evaluated for inclusion in the title commitment.

In some other implementations, two or more thresholds are used. For example, a first threshold, as described above, identifies liens where the likelihood that the lien has not been released exceeds the first threshold as identified for inclusion. A second threshold can be specified for likelihoods of the lien not being released as so low that it can automatically be determined that the lien should not be identified for inclusion in the title commitment. For likelihoods falling between the first and the second threshold, it may not be possible to make a definitive judgment. Therefore, these liens can be flagged for manual evaluation to determine whether or not they should be included in the title commitment for the parcel of real property.

The individual thresholds can be set according to various factors related to levels of acceptable risk in the prediction being wrong. For example, a collection of historical data can be used to determine an historical occurrence for the parameter. In the case of title defects resulting from unaccounted for involuntary liens, this can include past occurrences of similar defects and the value of the resulting title insurance claims. Few instances of significant defects can lead, for example, to a higher threshold level of risk being acceptable.

In some implementations, performance of the machine learning model is evaluated for a collection of historic data, which may be different from the original training data. Thus, known involuntary liens can be compared to the model output. Based on this, the performance of the model can be evaluated to determine which involuntary liens would have been incorrectly classified based on the model output values and the set thresholds. These missed liens can be used to estimate the value of potential claims against the title insurance that may have needed to be paid. Based on this, the threshold values can be optimized to correspond to a particular level of acceptable risk with respect to claims. The optimization can be performed, for example, using the Markov optimization described previously.

In some implementations, determining the one or more thresholds can include analyzing historical information on past commitments relative to other operating expenses and revenue to determine the threshold level such that the model will only pass predicted liens based on the lien amounts that would have been missed as magnitudes of cost within an acceptable amount of overall cost relative to revenue.

In some implementations, the one or more thresholds can be changed in view of actual performance of the model. For example, if a particular threshold leads to real world results of a higher number of errors than expected, then the threshold can be modified to require a higher likelihood that the lien is released before automatically determining that it does not need to be identified for inclusion in the title commitment. For example, updated training data based on performance can be used to retrain the model. However, such adjustment would need to take care to limit introducing additional biases.

Based on the comparison of the modeled likelihoods for each involuntary lien, the system determines the output result for the lien (step 510). The output can be to include the involuntary lien for inclusion in the title commitment. The output can be to not include the involuntary lien for inclusion in the title commitment. Finally, the output can be for manual evaluation of the lien.

The identified involuntary liens, including any determined from manual evaluation, can then be incorporated into a title commitment as part of generating a title insurance policy for the transaction involving the parcel.

In some implementations of the above described techniques, some of the obtained data can be associated with particular individuals. The techniques can be implemented to protect individual privacy and include suitable controls on access to the information. For example, the personal information of a prospective buyer of a parcel of real property can be used in response to received consent from the prospective buyer. In some cases, identifiable information of individual can also be anonymized using a suitable technique and appropriate safeguards placed to protect the personal information.

The present specification describes unconventional steps to solve problems associated with assessing title risk that are distinct from the conventional approach. In particular, a prediction of open mortgages can be generated programmatically using a model based on other parcels of real property where the model prediction may also be based on specific data values of the particular parcel of real property. Vesting can also be performed programmatically to eliminate manual evaluation of property deeds. Performing mortgage and vesting assessments allows for quicker evaluation of title risks than a traditional title assessment.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:

obtaining, from one or more sources, a collection of data associated with a specified parcel of real property, wherein the collection of data includes one or more involuntary liens associated with the specified parcel of real property;

training a machine learning model using a training set comprising a collection of data points and labels for a set of real property parcels distinct from the specified parcel of real property, each real property parcel of the training set including information about each involuntary lien attached to the parcel, wherein the training comprises extracting features from the training set and determining associated weights such that a prediction for each involuntary lien attached to the parcel generated by the machine learning model corresponds to the known parameter values;

inputting the collection of data to the machine learning model;

using the machine learning model to generate a prediction from the input collection of data for each of the one or more involuntary liens comprising:

generating for each of the one or more involuntary liens a respective probability value that the involuntary lien has not been released from the specified parcel of real property;

for each involuntary lien:

determining whether probability value that the involuntary lien has not been released from the specified parcel of real property satisfies one or more threshold values;

determining that the involuntary lien to be released or not released based on whether or not the probability satisfies the one or more threshold values; and using the determination for each involuntary lien as either released or not released to determine a risk tolerance for the parcel of real property and, based on the risk tolerance, determining whether to manually resolve one or more involuntary liens or to allow a title evaluation process to proceed for the parcel of real property.

2. The method of claim 1, wherein the obtained collection of data comprises a variety of data from a variety of data sources including a first data set for the specified parcel of real property and a second data set for one or more individuals associated with the specified parcel of real property.

3. The method of claim 1, wherein classifying a particular involuntary lien comprises comparing the likelihood value for the particular involuntary lien with a first threshold and a second threshold, wherein:

in response to determining that the likelihood value satisfies a first threshold, assigning a first classification to the involuntary lien, in response to determining that the likelihood value satisfies the second threshold, assigning a second classification to the involuntary lien, and in response to determining that the likelihood value satisfies neither the first nor the second thresholds, classifying the involuntary lien for manual evaluation.

4. The method of claim 1, wherein the data associated with the specified parcel of real property input to the machine learning model include dates associated with a recordation of the one or more involuntary liens and transaction data indicating dates in which ownership of the parcel changed.

5. The method of claim 1, wherein training the machine learning model includes learning how features of the training set affect the likelihood of the involuntary lien, wherein the feature includes one or more of an age of the involuntary lien, a type of the involuntary lien, a timing of other transactions associated with an associated parcel, and one or more changes in a status of persons associated with the parcel.

6. A system comprising:

one or more computers and one or more storage devices storing instructions that are operable, when executed by the one or more computers, to cause the one or more computers to perform operations comprising:

obtaining, from one or more sources, a collection of data associated with a specified parcel of real property, wherein the collection of data includes one or more involuntary liens associated with the specified parcel of real property;

training a machine learning model using a training set comprising a collection of data points and labels for a set of real property parcels distinct from the specified parcel of real property, each real property parcel of the training set including information about each involuntary lien attached to the parcel, wherein the training comprises extracting features from the training set and determining associated weights such that a prediction for each involuntary lien attached to the parcel generated by the machine learning model corresponds to the known parameter values;

inputting the collection of data to the machine learning model;

using the machine learning model to generate a prediction from the input collection of data for each of the one or more involuntary liens comprising:

generating for each of the one or more involuntary liens a respective probability value that the involuntary lien has not been released from the specified parcel of real property;

for each involuntary lien:

determining whether probability value that the involuntary lien has not been released from the specified parcel of real property satisfies one or more threshold values;

determining that the involuntary lien to be released or not released based on whether or not the probability satisfies the one or more threshold values; and using the determination for each involuntary lien as either released or not released to determine a risk tolerance for the parcel of real property and, based on the risk tolerance, determining whether to manually resolve one or more involuntary liens or to allow a title evaluation process to proceed for the parcel of real property.

7. The system of claim 6, wherein the obtained collection of data comprises a variety of data from a variety of data sources including a first data set for the specified parcel of real property and a second data set for one or more individuals associated with the specified parcel of real property.

8. The system of claim 6, wherein classifying a particular involuntary lien comprises comparing the likelihood value for the involuntary lien with a first threshold and a second threshold, wherein:

in response to determining that the likelihood value satisfies a first threshold, assigning a first classification to the involuntary lien, in response to determining that the likelihood value satisfies the second threshold, assigning a second classification to the involuntary lien, and in response to determining that the likelihood value satisfies neither the first nor the second thresholds, classifying the involuntary lien for manual evaluation.

9. The system of claim 6, wherein the data associated with the specified parcel of real property input to the machine learning model include dates associated with a recordation of the one or more involuntary liens and transaction data indicating dates in which ownership of the parcel changed.

10. The system of claim 6, wherein training the machine learning model includes learning how features of the training set affect the likelihood of the involuntary lien, wherein the feature includes one or more of an age of the involuntary lien, a type of the involuntary lien, a timing of other transactions associated with an associated parcel, and one or more changes in a status of persons associated with the parcel.

11. One or more non-transitory computer-readable storage media encoded with instructions that, when executed by one or more computers, cause the one or more computers to perform operations comprising:

obtaining, from one or more sources, a collection of data associated with a specified parcel of real property, wherein the collection of data includes one or more involuntary liens associated with the specified parcel of real property;

training a machine learning model using a training set comprising a collection of data points and labels for a set of real property parcels distinct from the specified parcel of real property, each real property parcel of the training set including information about each involuntary lien attached to the parcel, wherein the training comprises extracting features from the training set and determining associated weights such that a prediction for each involuntary lien attached to the parcel generated by the machine learning model corresponds to the known parameter values;

inputting the collection of data to the machine learning model;

using the machine learning model to generate a prediction from the input collection of data for each of the one or more involuntary liens comprising:

generating for each of the one or more involuntary liens a respective probability value that the involuntary lien has not been released from the specified parcel of real property;

for each involuntary lien:

determining whether probability value that the involuntary lien has not been released from the specified parcel of real property satisfies one or more threshold values;

determining that the involuntary lien to be released or not released based on whether or not the probability satisfies the one or more threshold values; and using the determination for each involuntary lien as either released or not released to determine a risk tolerance for the parcel of real property and, based on the risk tolerance, determining whether to manually resolve one or more involuntary liens or to allow a title evaluation process to proceed for the parcel of real property.

12. The non-transitory computer-readable storage media of claim 11, wherein the obtained collection of data comprises a variety of data from a variety of data sources including a first data set for the specified parcel of real property and a second data set for one or more individuals associated with the specified parcel of real property.

13. The non-transitory computer-readable storage media of claim 11, wherein classifying a particular comprises comparing the likelihood value for the particular involuntary lien with a first threshold and a second threshold, wherein:

in response to determining that the likelihood value satisfies a first threshold, assigning a first classification to the involuntary lien, in response to determining that the likelihood value satisfies the second threshold, assigning a second classification to the involuntary lien, and in response to determining that the likelihood value satisfies neither the first nor the second thresholds, classifying the involuntary lien for manual evaluation.

14. The non-transitory computer-readable storage media of claim 11, wherein the data associated with the specified parcel of real property input to the machine learning model include dates associated with a recordation of the one or more involuntary liens and transaction data indicating dates in which ownership of the parcel changed.

15. The non-transitory computer-readable storage media of claim 11, wherein training the machine learning model includes learning how features of the training set affect the likelihood of the involuntary lien, wherein the feature includes one or more of an age of the involuntary lien, a type of the involuntary lien, a timing of other transactions associated with an associated parcel, and one or more changes in a status of persons associated with the parcel.

\* \* \* \* \*